(No Model.) J. W. SPANGLER, Dec'd. 4 Sheets—Sheet 2.
L. S. SPANGLER, Executrix.
PARIS GREEN OR FERTILIZER DISTRIBUTER.
No. 544,012. Patented Aug. 6, 1895.
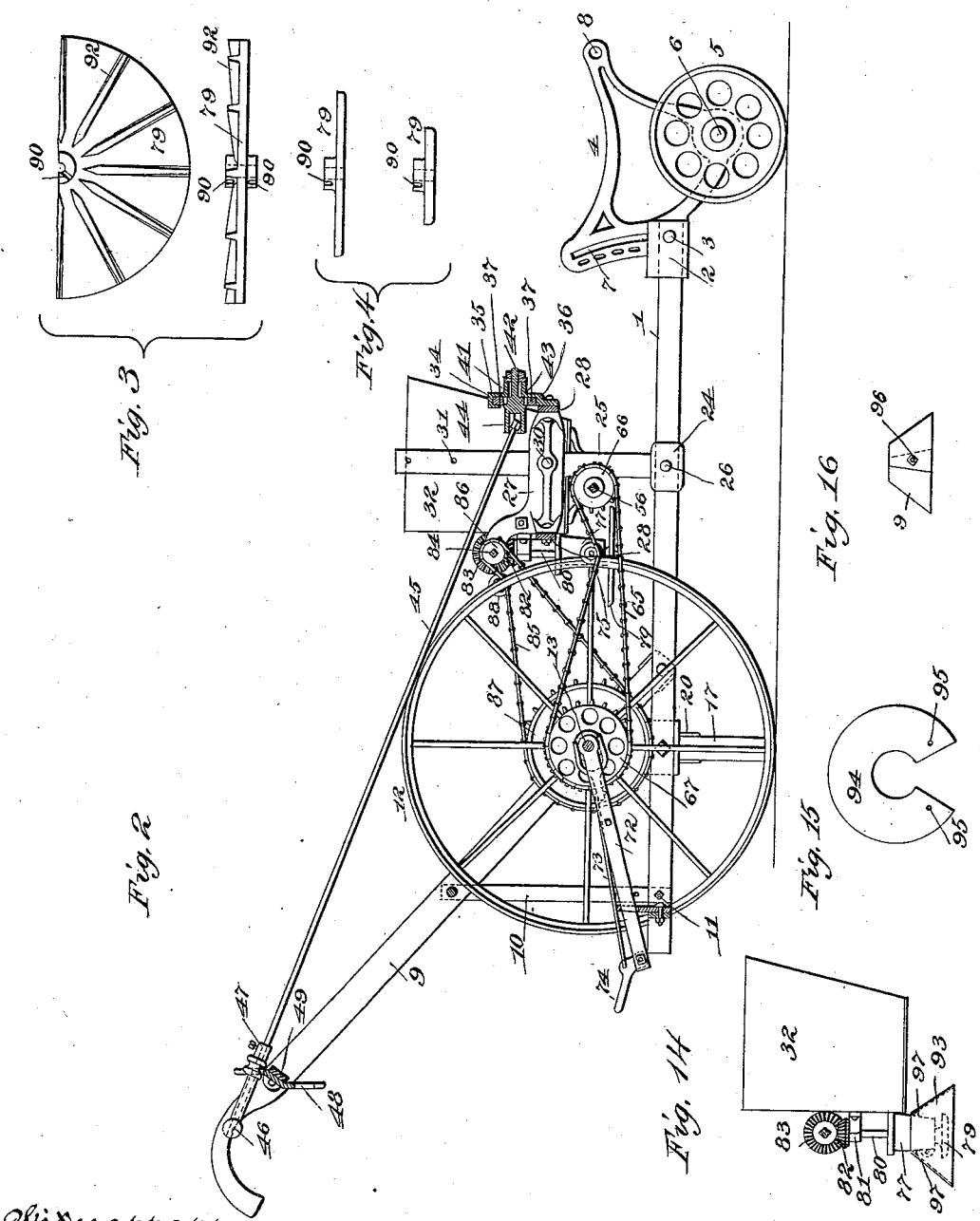

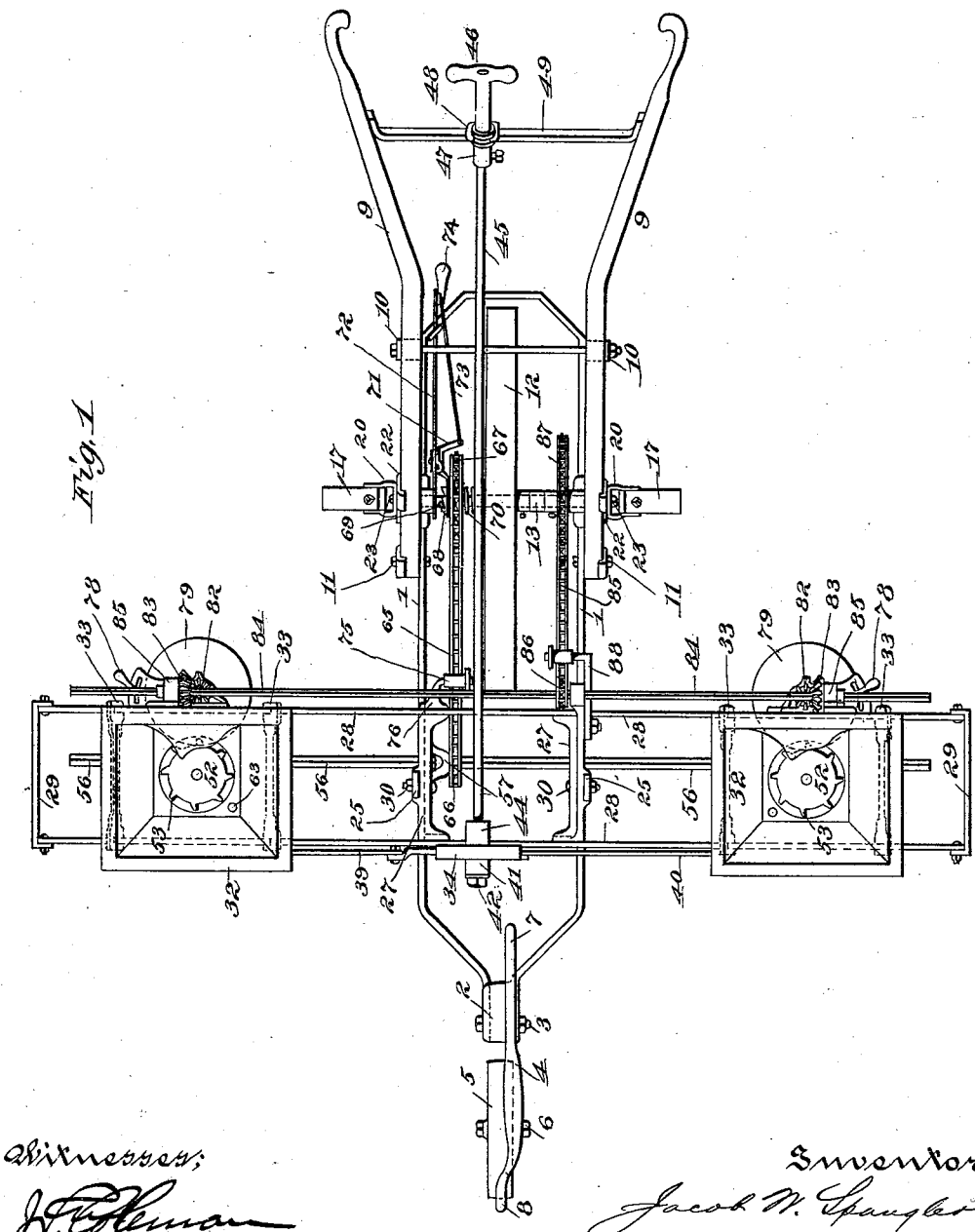

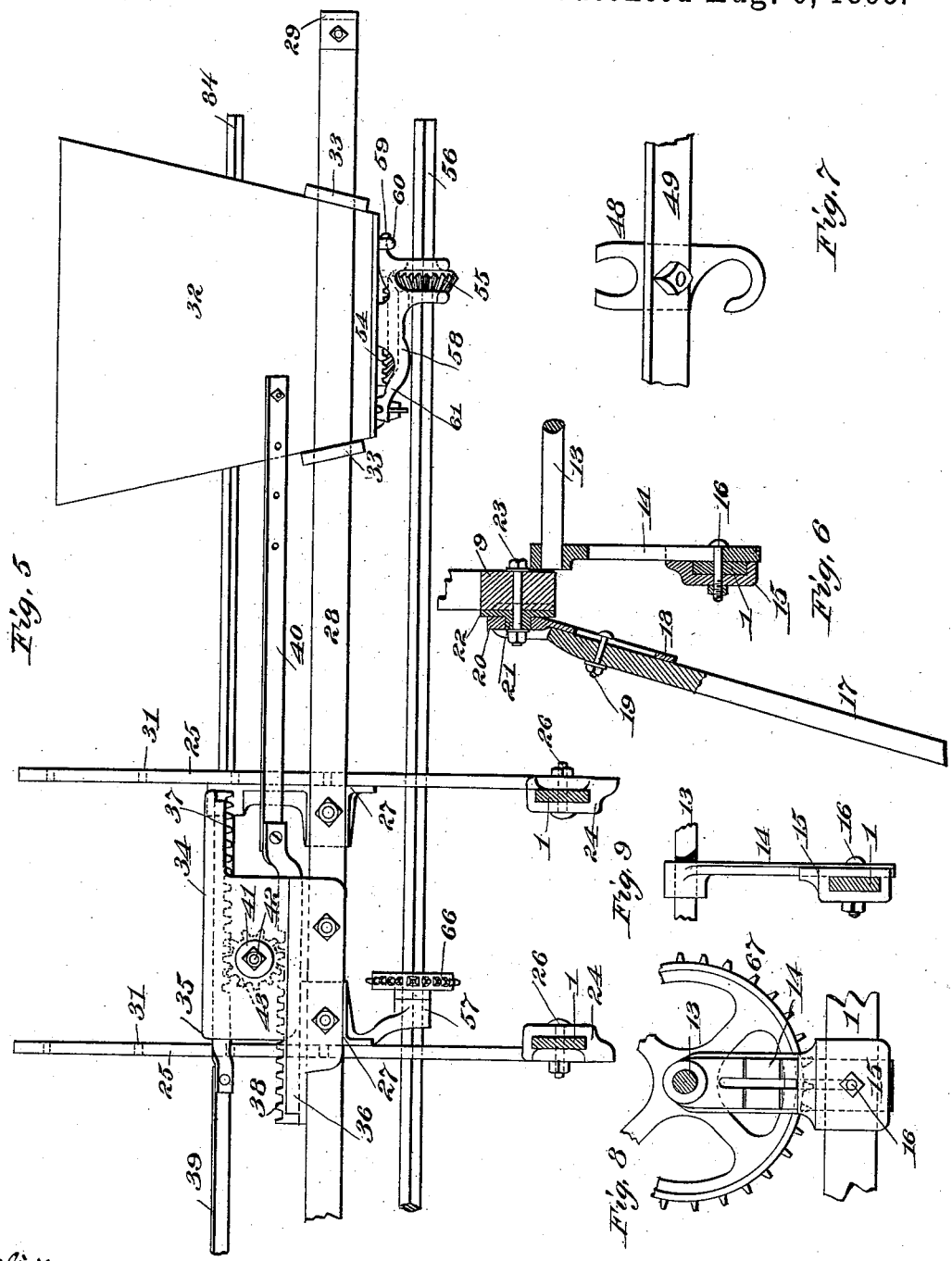

(No Model.) J. W. SPANGLER, Dec'd. 4 Sheets—Sheet 4.
L. S. SPANGLER, Executrix.
PARIS GREEN OR FERTILIZER DISTRIBUTER.

No. 544,012. Patented Aug. 6, 1895.

UNITED STATES PATENT OFFICE.

JACOB W. SPANGLER, OF YORK, PENNSYLVANIA; LAURA S. SPANGLER EXECUTRIX OF SAID JACOB W. SPANGLER, DECEASED.

PARIS-GREEN OR FERTILIZER DISTRIBUTER.

SPECIFICATION forming part of Letters Patent No. 544,012, dated August 6, 1895.

Application filed February 16, 1894. Serial No. 500,397. (No model.)

*To all whom it may concern:*

Be it known that I, JACOB W. SPANGLER, a citizen of the United States, residing at York, in the county of York and State of Pennsylvania, have invented a certain new and useful Improvement in Paris-Green or Fertilizer Distributers, of which the following is a full, clear, and exact description.

The main object of this invention is to provide a machine for distributing paris green on growing plants, but, as will presently appear, the invention is applicable for distributing fertilizer and other substances or materials.

The principle of the invention may be stated briefly to consist in hoppers for containing the material to be distributed, which are mounted upon an adjustable frame so that they may be operated at an elevation corresponding with the height of the plants to be treated, the said hoppers also being adjustable horizontally toward and from one another to correspond with the width of the rows of plants. The hoppers are provided with suitable feeding devices and with changeable distributer-plates to scatter the material more or less widely. The machine preferably has wheels arranged in tandem, like a bicycle, and the frame of the machine is provided with gravitating legs to hold it upright when at rest. The feeding devices of the hoppers are made removable by means of a hinged spider.

Having thus stated the principle of my invention, I will proceed now to describe the best mode in which I have contemplated applying that principle, and then will particularly point out and distinctly claim the part, improvement, or combination which I claim as my invention.

Figure 10:
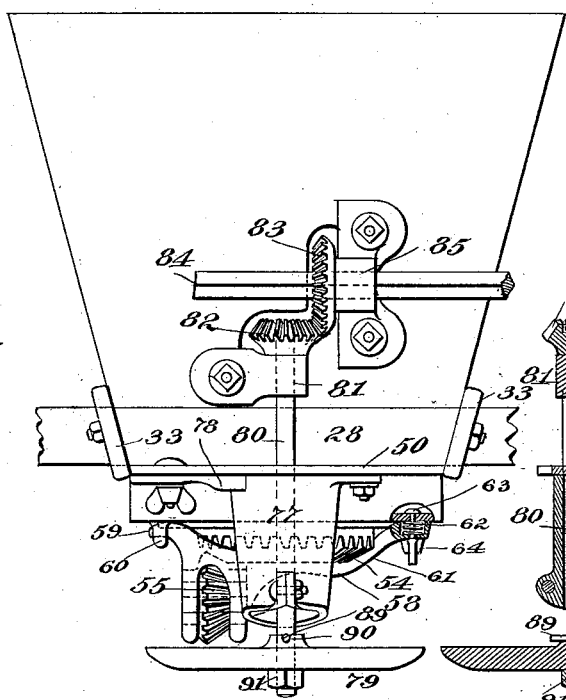
Figure 11:
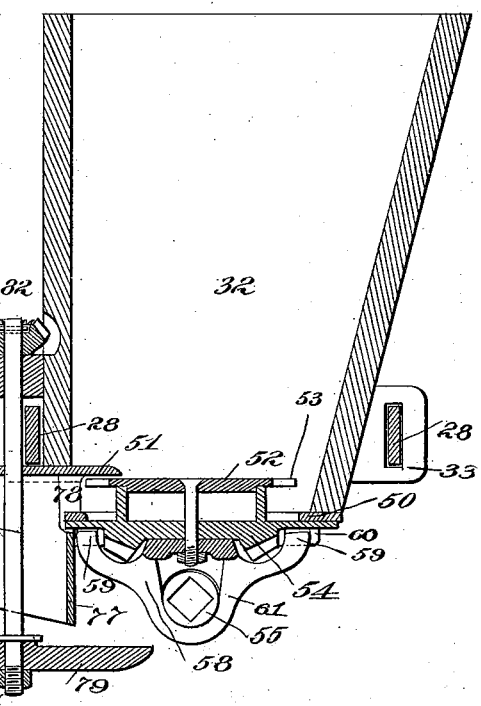
Figure 12:
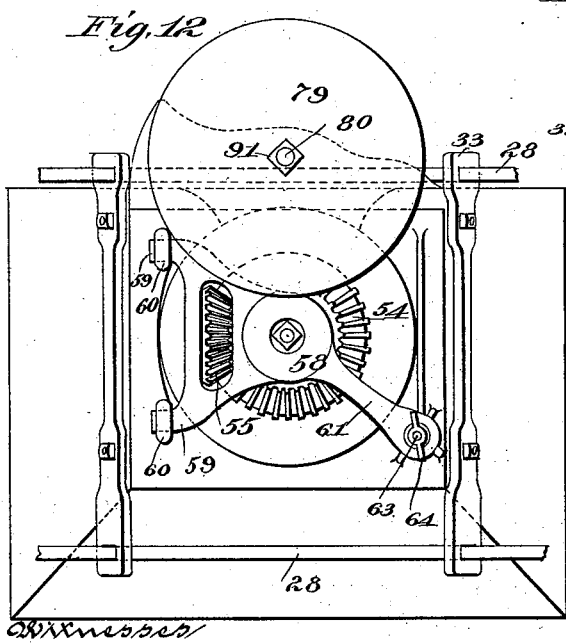
Figure 13:
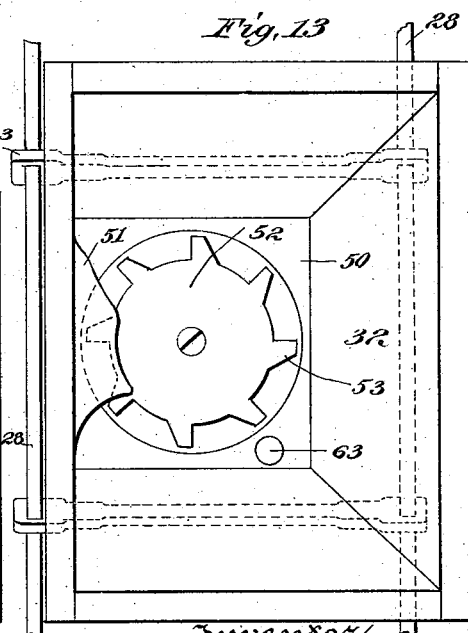

In the accompanying drawings, illustrating my invention, in the several figures of which like parts are similarly designated, Figure 1 is a top plan view. Fig. 2 is a side elevation. Fig. 3 shows a part of one of the distributer-plates in plan and side elevation, and Fig. 4 shows two others of the distributer-plates in side elevation. Fig. 5 is a front elevation on a larger scale of one of the hoppers and the mechanism for adjusting both of the hoppers horizontally toward and from one another. Fig. 6 is a sectional elevation of the gravity-leg and the rear adjusting mechanism of the frame. Fig. 7 is an elevation of the change-bearing for the hopper-adjusting spindle. Fig. 8 is a side elevation of one of the main wheel-supports, and Fig. 9 a rear elevation of same. Fig. 10 is a rear elevation of the hopper. Fig. 11 is a vertical section of the same. Fig. 12 is a bottom plan view of the same, and Fig. 13 is a top plan view of the same, portions of the hopper-supporting frame being shown in these several views 10, 11, 12, and 13. Fig. 14 is an elevation of a disk-shield in position, and Figs. 15 and 16 details of same detached.

The main frame may consist of parallel metal bars 1, which converge at their front ends and are provided there with a clamping member 2 and bolt 3 for the reception of a combined clevis and support 4 for the pilot-wheel 5, the said pilot-wheel being journaled in the lower end of said clevis upon a bolt or stud 6. This clevis 4 is provided with a slotted segmental end 7, by which it may be adjusted in the clamp 2, and the forward end of said clevis is provided with an eye 8, by which the team or draft-animal may be hitched to the machine. (See Fig. 2.)

The handles 9 are pivoted at their lower ends to the bars 1 of the main frame and are supported in adjustable position thereon by upright stays 10, which are provided with a number of bolt-holes at their lower ends, by means of which the said stays may be adjustably secured to the bars 1 by means of bolts 11. The wheel 12 is fixed to turn with an axle 13. The axle 13 has its bearings in longitudinally-slotted stands or wheel-supports 14, and these stands are made vertically adjustable in housings 15 by means of bolts 16. (See Figs. 8 and 9.) The housings 15 embrace the bars 1 of the main frame.

It will be observed that the pilot-wheel 5 and the main wheel 12 are in line—that is to say, arranged tandem or bicycle fashion—and this arrangement I prefer in order to adapt the machine to be dragged between furrows or rows with the least possible draft and with the least possible liability to injure growing plants.

Again, I have found this arrangement enables the operator to manage the machine much more readily.

In order to prevent the machine from toppling over when at rest I provide the gravity-legs 17, which may be made of wood, and in the form shown are provided with socket-pieces 18, slotted longitudinally. (See Fig. 6.) Each leg is secured in its socket adjustably relatively to the length of the leg by means of a bolt 19. The socket-piece 18 is provided with a hub 20, which is fitted to rotate freely about a journal 21 on a wear-plate 22, made fast to the handle 9 by means of a bolt 23. These legs 17 stand off from the frame at an outward inclination and, as it were, shore up the frame. Whenever the machine is dragged forwardly or rearwardly the gravity-legs are free to move in the opposite direction, and thereby afford no impediment to the movement of the machine; but whenever the machine comes to rest these legs assume an upright position and so shore up or support the machine against toppling over.

Mounted upon the bars 1 of the main frame, in front of the main wheel, are clamps 24. These clamps receive uprights 25, and the clamps and uprights are bolted to the frame by means of bolts 26. These uprights 25 support cross-pieces 27 in a horizontal position, and these cross-pieces 27 in turn have bolted to them the parallel horizontal bars 28, which constitute the hopper-supporting frame. These bars 28 are provided with end pieces 29, whereby their rigidity is insured. The bolts 30, by which the uprights and cross-pieces are united, are adapted to be changed to one or another of a series of holes 31 in the uprights 25, in order to adjust the elevation of the hopper-supporting frame. The hoppers 32 are mounted upon the bars 28 by means of the brackets 33, the ends of which are slotted to receive the said bars 28, as more particularly shown in Figs. 10 to 13.

In order to provide for the adjustment of the hoppers upon the hopper-supporting frame toward and from one another I employ a bracket 34, which is bolted to one of the bars 28, and this bracket is provided with guideways 35 and 36, in which are arranged toothed racks 37 and 38, and these toothed racks are connected, respectively, by rods or bars 39 and 40 with the hoppers. As shown in Fig. 5, the connecting-bars leading from the racks to the hoppers may be provided with a series of bolt-holes, in order to provide for their lengthening or shortening relatively to the hoppers. The bracket 34 is provided with a hub 41 to receive the journal 42 of a gear-wheel 43, which gear-wheel meshes with the racks 37 and 38 to move them in opposite directions. The gear-wheel is provided with a socket 44 to receive the headed end of a spindle 45, by which the said gear-wheel may be rotated. This spindle extends rearwardly to the handles of the machine, and is provided with a head 46 for convenience in rotating it.

The said spindle is supported upon the handles by means of an adjustable grooved collar 47 arranged upon said spindle and adapted to engage one or the other of the bearings of the change-bearing 48 secured to the cross-bar 49 or other convenient portion of the handles. The purpose of this change-bearing is to adapt the spindle to the changes of elevation of the hopper-supporting frame. The said change-bearing may be made as a casting, in the form substantially shown in Fig. 7, and bolted to the cross-piece 49 of the handles. It is obvious that the hoppers may be moved toward and from one another to vary their proximity relatively to the width of the rows of plants to be operated upon, and in whatever position they may be placed it is equally obvious that the rack and pinion gearing will hold them in such given position. It is also obvious that by virtue of this means of adjusting the hoppers the said hoppers may be adjusted very readily without stopping the machine, and as circumstances require.

Of course I am aware that it is not broadly original with me to provide laterally adjustable hoppers, nor is it likewise original with me to use racks and a pinion to effect the adjustment of two bodies toward and from one another.

While I have shown a feeding device of peculiar construction and one which I prefer, yet I do not limit my invention to the employment of this particular feeding device. The feeding device shown consists of a bottom plate 50, which is made integral with the gate-cover 51. The feed-dish 52 is provided with tangentially or equivalently arranged stirrers or fingers 53, and is mounted upon a toothed plate 54, arranged below the bed-plate and adapted to be rotated by a pinion 55, which is mounted upon the shaft 56, the said shaft having a main bearing in a housing 57, depending from one of the cross-pieces 27. The ends of the shaft 56 are supported within spiders 58 beneath the hoppers. These spiders 58 are provided with projections 59, which engage loops 60 depending from the bed-plate of the hoppers, and, as shown more particularly in Figs. 10 and 12, the spider is provided with an arm 61, in the end of which is made a socket to receive a coiled or other spring 62, and a bolt 63 is passed down from inside the hopper through its bed-plate and the spring and socketed end of the spider-arm and provided with a winged or other nut 64 for securing the spider in position and in permitting a certain amount of yielding play. The spider 58, as shown in Fig. 5 more particularly, has parallel projections between which the gear-wheel 55 is arranged, and by which it is held in position. It is obvious that by removing the nut 64 the spider may be disengaged from its bolt, and by slipping the shaft 56 longitudinally out of its bearings the spider may be entirely removed from the hopper and the feed mechanism of the hopper be readily detached for renewal or other purposes. A further function of this hinged spider is to admit of the separation of the feed-disk-carrying toothed plate 54 from the bed-plate of the hopper, so as to bring them out of contact when the machine is not in use, and thereby prevent them from rusting together or being united by corrosion. This separation is effected by loosening the nut 64, whereby the spring 62 forces the spider and its accessories, including the plate 54, away from and out of contact with the bed-plate, and retains them so until it is desired again to use the machine when by tightening up the nut the parts are again restored to positions for use. Should the toothed plate 54 turn or work hard it may be given freedom of movement by loosening the nut and allowing the spider to drop away sufficiently. The spring 62, always bearing against the arm of the spider, serves as a nut-lock to prevent the nut 64 from working off. This provision of the removable hinged spider I esteem of considerable value and importance in a machine of this character, and, obviously, it is applicable to the feeds of various kinds of planters, such as grain-drills and the like.

The shaft 56 is driven from the shaft of the main wheel by any suitable means. I have shown a chain 65 which extends from a sprocket wheel 66 on the said shaft 56 to a complemental sprocket-wheel 67 on the shaft 13 of the main wheel. This sprocket-wheel 67 is arranged loosely on the axle or shaft of the main wheel and is provided with a clutch hub 68, which is normally held in engagement with a transverse pin 69 in the said shaft or axle, the said pin forming the other member of the clutch. A spring 70 normally holds the clutch member in engagement with the pin 69, and thereby insures the rotation of the sprocket-wheel 67 with the main-wheel shaft, and hence the driving of the feeds in the hoppers. In order to stop the distribution of materials from the hoppers the sprocket-wheel 67 is adapted to be disconnected from the shaft by means of a clutch-lever 71, which is supported upon a bar 72, rigidly mounted upon the axle and the frame of the machine. This clutch-lever is provided with an operating rod 73 extending to the rear of the machine and provided with a pedal 74 in convenient reach of the foot of the operator. This pedal is connected eccentrically with the operating-rod 73, so that when thrown down it locks the sprocket-wheel in inoperative position, and when thrown up it leaves the spring 70 free to throw the sprocket-wheel into engagement with the clutch-pin 69. I have shown the roller 75 mounted upon a bracket 76 depending from one of the bars 28, the said roller serving as a belt-tightener for the chain 65 and being adjustable upon the frame 28 for this purpose.

77 is the discharge spout or mouth of the hopper, and the opening from the hopper into this discharge-spout may be provided with any suitably-adjustable gate 78. Beneath this spout I arrange a distributer-disk 79 upon a shaft 80, which passes up through the spout and is suspended from the hopper by means of a bracket 81, fastened to the hopper. The upper end of this shaft is provided with a gear-wheel 82, and this gear-wheel meshes with a gear-wheel 83 on a shaft 84, which is supported in brackets 85, made fast to the hoppers. Both the shafts 56 and 84 are made square or angular or otherwise constructed to insure the rotation of the gear-wheels which they support, and at the same time permit the movement of the hoppers toward and from one another. The shaft 84 is driven from the shaft of the main wheel by means of a chain 85, engaging sprocket-wheels 86 and 87 on the shafts 84 and 13, respectively, the sprocket-wheel 87 being fast upon the said shaft 13. The belt-tightener 88, of any approved construction, is arranged to keep the chains 85 taut. The said distributer disk or plate may be secured to its shaft 80 by means of pin or key 89, laid in a groove 90 in the hub of the disk and passing through the shaft 80, and a nut 91 screwed onto the end of the shaft below the said disk.

The distributer-disk 79 is made in a variety of forms, in accordance with the character of distribution desired. In Fig. 3 the distributer-disk 79 is made relatively large and with two faces, one of which is provided with radially or otherwise disposed elevated ribs 92, and the other face is made plane, so that the disk may be reversed for use on either side. The ribs serve to scatter the material over a wide area, while the plane face is adapted to spread the material in a more restricted area. Disks of smaller diameter and having a single plane operating-face, as in Fig. 4, may be used in accordance with the area of distribution desired; or, in other words, a disk will be employed to distribute the material in accordance with the distance the plants are planted from one another or in accordance with the spacing of the rows of the plants.

Obviously, I do not limit my invention to the use of the distributer-disk having one face ribbed and the other plane to the larger sizes, as it is within my invention to make all the sizes with such opposite ribbed and plane faces, and in practice the set of disks will be furnished with one face ribbed and the other plane. Neither do I limit my invention to the form of ribs shown. As is obvious, the material that is fed from the hoppers by the feeding mechanisms therein falls from the spouts upon these distributer-disks so placed, and since the said disks or plates are timed to rotate very rapidly the material fed thereon is thrown out and distributed quite evenly and very efficiently. I esteem the use of these distributer-disks so placed of very great importance in the distribution of paris green or other like insect-destroying poisons when used alone or in connection with pulverulent fertilizing material.

The ribbed disk is especially efficient in the distribution of pulverulent fertilizing material, since it may be distributed broadcast, as it were, very efficiently.

By means of the provision hereinabove described for adjusting the frames, it is obvious that my machine may be used with plants of considerable height as well as with plants just sprouting above the earth.

In windy weather or on coasts where the field is exposed to strong breezes, pulverulent matter is apt to be blown about so violently as to render its proper distribution impossible, and in order to counteract this effect of the wind I provide the distributing-disks with a shield 93, Fig. 14, made in the form of a truncated hollow cone and supported upon the spout 77 in any suitable manner, so as to extend down over and laterally inclose the disk. This shield may be made in a variety of ways; but a simple and cheap construction is to cut out a blank 94 from sheet metal, as in Fig. 15, provide it with holes 95 in adjacent ends, lap it about the spout and there secure its ends by a bolt 96, passed through its holes 95, as in Fig. 16. In order further to secure the shield in position, it may be made to engage or co-operate with lugs 97 on the spout. This shield thus surrounds the disk like a skirt and so protects it from upper and horizontal air or wind currents while not in the least interfering with, but rather promoting, the distribution of the substance to be spread. This shield also performs another function—namely, it protects the distributer-disk from immediate contact with wet or dew-covered plants and so preserves it from being wet-coated with the material being distributed.

The various frames and shapes hereinabove described may be formed of merchant shapes of steel or other suitable metal without forging and in a very economical manner.

When it is observed that the hoppers extend laterally of the main frame for a considerable distance the utility of the gravity-legs will be apparent.

I have thus described the best mode in which I have contemplated applying the principle of my invention; but I wish it to be understood that I do not limit my invention to mere details of construction, and, as already intimated, I do not limit it to its use for distributing paris-green or insecticides of any kind, but expressly state, what is perfectly obvious, that the machine is admirably adapted for the distribution of powdery fertilizer, lime, plaster, and other materials. Neither do I limit my invention to the use of supporting or driving wheels arranged in tandem, since the machine is capable of use with side wheels.

What I claim is—

1. A main frame provided with handles, supporting wheels arranged tandem in said frame, and a hopper-supporting frame arranged substantially at right angles to the main frame, hoppers mounted upon the hopper-supporting frame on opposite sides and clear of the wheels and movable toward and from one another, feeding devices in said hoppers, and means to drive the said feeding devices, substantially as described.

2. A main frame, provided with handles supporting wheels arranged in said frame in tandem, a hopper-supporting frame mounted adjustably upon uprights rising from the main frame, hoppers arranged upon the hopper-supporting frame and adjustable toward and from one another, feeding devices in said hoppers, means to drive them, and means to adjust the wheels and the main frame relatively to one another, substantially as described.

3. A main frame and a hopper-supporting frame arranged thereupon transversely, hoppers adapted to be moved toward and from each other upon said hopper-supporting frame, racks and a pinion interposed between them, an operating spindle for said pinion extending to within reach of the machine operator, and connections between the said racks and the said hoppers, substantially as and for the purpose described.

4. In a machine for distributing paris-green and other substances or materials, a hopper having a suitable feed mechanism of any approved construction, a discharge spout, a vertical spindle, a countershaft with which said spindle is geared, a main shaft, and driving connections between the main shaft and countershaft, and a reversible, ribbed distributer disk or plate arranged beneath the said discharge spout on said vertical spindle whereby it is adapted to be rotated, substantially as described.

5. A main frame provided with handles, supporting wheels arranged tandem in said frame, gravity legs pivotally connected with the main frame and standing off from the same at an angle, a hopper-supporting frame arranged substantially at right angles to and upon the main frame, hoppers mounted upon the hopper-supporting frame on opposite sides and clear of the wheels, and movable toward and from one another thereon, feeding devices in said hoppers, and means to drive the said feeding devices, substantially as described.

6. In a machine for distributing paris green and other substances or materials, a main frame and its supporting wheels arranged in tandem therein, a hopper-supporting frame, and hoppers thereon, and handles, combined with gravity legs pivotally connected with the main frame by means of the socket-pieces 18 provided with hubs 20 and fitted to journals 21 on wear-plates 22, the legs standing off from the frame at an angle, substantially as described.

7. In a machine for distributing paris green and other substances or materials, a main frame, means to adjust it vertically, and its supporting wheels arranged tandem, combined with gravity legs pivotally connected with the main frame and standing off from the same at an angle, the pivot-pieces of said legs being provided with slots whereby said legs are capable of adjustment longitudinally, substantially as described.

8. In a machine for distributing paris green and other substances or materials, a hopper having a bed-plate provided with depending loops, a feed mechanism and a supporting spider therefor constructed with projections for detachable engagement with said loops and adapted to be secured in place by a single bolt and to be detached bodily from the hopper by removing the said bolt and sliding its projections out of the loops, thereby to permit the ready removal and insertion of the feed mechanism, substantially as described.

9. In a machine for distributing paris green and other substances or materials, a main frame and guiding handles therefor a hopper, a feed mechanism therein, a driving shaft for said feed mechanism, a main wheel for the said machine, a chain and sprocket connection between the shaft of the said main wheel and the driving shaft of the feed mechanism, a clutch for connecting the chain and sprocket mechanism with the main wheel and disconnecting it therefrom, and a clutch-operating pedal arranged within convenient reach of the machine operator's foot, substantially as described.

10. In a machine for distributing paris green and other substances or materials, a main frame and a hopper-supporting frame arranged thereon, hoppers mounted upon said hopper-supporting frame, means to adjust said hoppers toward and from one another, upon such hopper-supporting frame and a device for actuating the said hopper-adjusting mechanism comprising a spindle extended to within easy reach of the machine operator, and a change bearing for said spindle, substantially as and for the purpose described.

11. In a machine for distributing paris green and other substances or materials, a hopper having a suitable feed mechanism of any approved construction, a discharge spout, a vertical spindle, a countershaft with which the spindle is geared, a main shaft and driving connections between the main shaft and countershaft, and a reversible distributer plate or disk arranged on said spindle beneath the said discharge spout and adapted to be rotated, substantially as described.

12. In a machine for distributing powdery or other substances, a hopper having a bed-plate provided with depending loops, a feeding device arranged therein, a spider having projections at one end to engage the loops on such bed-plate and having an arm at its other end extending beneath and supporting the feeding device, and an adjustable support for such arm, whereby the said spider may be adjusted upon its hinge so as to bring the feeding device into more or less close connection with the bed-plate, and to separate the two to prevent rusting together, substantially as described.

13. In a machine for distributing powdery and other substances, a hopper having a bed-plate provided with depending loops, a feeding device arranged therein, a spider having projections at one end to engage the loops on such bed-plate and having at its other end an arm extending beneath and supporting the feeding device, a bolt, spring and nut for adjustably connecting the spider with the hopper, substantially as described.

14. A main frame, supporting wheels, a hopper-supporting frame arranged substantially at right angles to the main frame upon uprights rising from such main frame, and means to adjust such hopper-supporting frame at various elevations upon the said uprights, hoppers mounted upon the hopper-supporting frame, and means to move such hoppers upon such hopper-supporting frame toward and from one another to vary their distance apart, feeding devices in said hoppers, and means to drive the said feeding devices, substantially as described.

In testimony whereof I have hereunto set my hand this 9th day of February, A. D. 1894.

JACOB W. SPANGLER.

Witnesses:
A. N. GREEN,
JOHN A. HOOBER.